(12) United States Patent
Itaya et al.

(10) Patent No.: US 9,562,980 B2
(45) Date of Patent: Feb. 7, 2017

(54) SCINTILLATOR PANEL AND RADIATION DETECTOR

(71) Applicant: Konica Minolta Inc., Tokyo (JP)

(72) Inventors: Keiko Itaya, Hino (JP); Makoto Iijima, Isehara (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/878,651

(22) Filed: Oct. 8, 2015

(65) Prior Publication Data

US 2016/0116606 A1    Apr. 28, 2016

(30) Foreign Application Priority Data

Oct. 23, 2014    (JP) ................. 2014-216280

(51) Int. Cl.
*G01T 1/20*   (2006.01)
*G01T 1/202*   (2006.01)
*G21K 4/00*   (2006.01)

(52) U.S. Cl.
CPC ............ *G01T 1/2023* (2013.01); *G01T 1/202* (2013.01); *G21K 2004/04* (2013.01); *G21K 2004/08* (2013.01); *G21K 2004/10* (2013.01); *G21K 2004/12* (2013.01)

(58) Field of Classification Search
CPC .................. G01T 1/2018; G01T 1/20
See application file for complete search history.

(56) References Cited

U.S. PATENT DOCUMENTS

| | | | | |
|---|---|---|---|---|
| 7,375,341 B1* | 5/2008 | Nagarkar | ............ | G01T 1/2002 250/370.11 |
| 2005/0051736 A1* | 3/2005 | Isoda | ............ | G03B 42/08 250/484.4 |
| 2011/0291018 A1* | 12/2011 | Nagano | ............ | G01T 1/2018 250/369 |
| 2013/0099130 A1* | 4/2013 | Nakahashi | ............ | A61B 6/00 250/394 |

FOREIGN PATENT DOCUMENTS

| | | |
|---|---|---|
| JP | 2005114456 A | 4/2005 |
| JP | 2012047487 A | 3/2012 |
| WO | 2010140410 A1 | 12/2010 |
| WO | 2011010482 A1 | 1/2011 |

* cited by examiner

*Primary Examiner* — Kiho Kim
(74) *Attorney, Agent, or Firm* — Lucas & Mercanti, LLP

(57) ABSTRACT

A scintillator panel includes: a flexible substrate; a phosphor arranged on the flexible substrate; and a thermal expansion compensation layer disposed between the flexible substrate and the phosphor, wherein a linear expansion coefficient of the thermal expansion compensation layer is greater than a thermal expansion coefficient of the phosphor, and surfaces, of the thermal expansion compensation layer and of the flexible substrate, in contact with each other each contain an organic substance.

8 Claims, 3 Drawing Sheets

SCINTILLATOR PANEL AND RADIATION DETECTOR

The entire disclosure of Japanese Patent Application No. 2014-216280 filed on Oct. 23, 2014 including description, claims, drawings, and abstract are incorporated herein by reference in its entirety.

BACKGROUND OF THE INVENTION

Field of the Invention

The present invention relates to a scintillator panel with reduced warpage of the panel itself and reduced crack formation in a phosphor layer, and also to a radiation detector using the scintillator panel.

Description of the Related Art

In recent years, clinical sites use, for diagnoses of disease conditions, radiation detectors that convert a radiation emitted from a radiation source and transmitted through an imaged site of the subject, into an electrical charge to generate a digital radiological image. Such radiation detectors are categorized into two groups: (1) those of a scintillator type, which each convert a radiation into visible light through a phosphor layer containing $Gd_2O_2S$, CsI, or other material, and then convert the light into an electrical charge by means of a photoelectric conversion device (PD), and (2) those of a type that each convert the X-ray directly into an electrical charge by means of an X-ray detection device, which is typically formed of Se. The scintillator type draws more attention.

As far as a radiation detector of a scintillator type is concerned, JP 2005-114456 A, for example, discloses a radiation detector that has in combination a scintillator panel and a photoelectric conversion device that uses a thin film transistor (TFT) and a charge-coupled device (CCD).

In order to meet market demand for smaller size, lighter weight, and/or wider variation of radiation detectors, materials having lighter weight, thinner thickness, and good workability are desired. A technique that uses a resin substrate as a substrate for supporting the phosphor has been proposed to meet these demands (JP 2012-47487 A).

However, when a highly flexible material such as a resin substrate is used, a difference in the linear expansion coefficient between a phosphor and a resin substrate presents a problem in that, due to heat generated during a manufacturing process and/or in a use environment, the scintillator panel warps, and is then separated from the photoelectric conversion device, or a crack develops in the phosphor to cause deterioration in image quality, for example.

In order to solve these problems, patent documents such as WO2011/010482 and WO2010/140410 disclose techniques to prevent warpage by attaching a warpage prevention resin film on a surface that is to face the resin substrate, of the phosphor layer, or by sandwiching the scintillator panel between a sensor substrate disposed on the photoelectric conversion device and a rigid plate made of a material similar to that of the sensor substrate. Nevertheless, a technology that controls warpage by the scintillator panel by itself has not been disclosed.

SUMMARY OF THE INVENTION

The present invention has been made in view of the above circumstances, and it is an object of the present invention to provide a scintillator panel and a radiation detector capable of preventing warpage of the scintillator panel, crack formation in the phosphor, and similar damages caused by heat generated during a manufacturing process and/or in a use environment, without using a rigid plate, a warpage prevention film, or similar means, and capable of being constantly in close contact with the photoelectric conversion device at a constant distance.

The problem described above in relation to the present invention is solved by the Items described below.

[1] To achieve the abovementioned object, according to an aspect, a scintillator panel reflecting one aspect of the present invention comprises a flexible substrate, a phosphor arranged on the flexible substrate, and a thermal expansion compensation layer disposed between the flexible substrate and the phosphor, wherein a linear expansion coefficient of the thermal expansion compensation layer is greater than a thermal expansion coefficient of the phosphor, and surfaces, of the thermal expansion compensation layer and of the flexible substrate, in contact with each other each contain an organic substance.

[2] The scintillator panel of Item. 1, wherein a light emitting surface and side surfaces of the phosphor, and side surfaces and a portion of a lower surface of the flexible substrate are preferably covered with a moisture-impermeable protective layer.

[3] The scintillator panel of Item. 1 or 2, wherein a thickness of the thermal expansion compensation layer is preferably greater than or equal to 1 μm and less than or equal to 100 μm.

[4] The scintillator panel of any one of Items. 1 to 3, wherein the thermal expansion compensation layer preferably contains a filler.

[5] The scintillator panel of Item. 1, wherein a phosphor layer is preferably formed from an additive, as a starting material, containing cesium iodide and thallium using a vapor deposition technique.

[6] The scintillator panel of Item. 1, wherein the flexible substrate preferably contains at least one of a resin selected from the group of: polyethylene terephthalate, polyethylene naphthalate, cellulose acetate, polyamide, polyimide, polyether-imide, epoxy, polyamide-imide, bismaleimide, fluororesins, acrylic resins, polyurethane, aramide, nylon, polycarbonate, polyphenylene sulfide, polyether sulfone, polysulfone, polyether ether ketone, and liquid crystal polymer, or a carbon fiber reinforced resin; or the flexible substrate is preferably a thin film glass having a surface coated with a resin layer.

[7] The scintillator panel of Item. 1, wherein the thermal expansion compensation layer preferably contains at least one polymer selected from the group of: polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (nitrocellulose), styrene-butadiene copolymers, various synthetic rubber-based resins, phenolic resins, epoxy resins, urea resins, melamine resins, phenoxy resins, silicone resins, acrylic resins, and urea formamide resins.

[8] A radiation detector preferably including: the scintillator panel of any one of Items. 1 to 7 as a line sensor.

[9] The radiation detector of Item. 8, wherein the scintillator panel and a plurality of sensors are preferably used in combination.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

As used herein, the term "scintillator" refers to a phosphor that absorbs energy of an incident radiation, such as an X-ray, and emits an electromagnetic wave (light) having wavelengths ranging from about 300 to 800 nm, that is, mainly including visible light.

Figure 1:
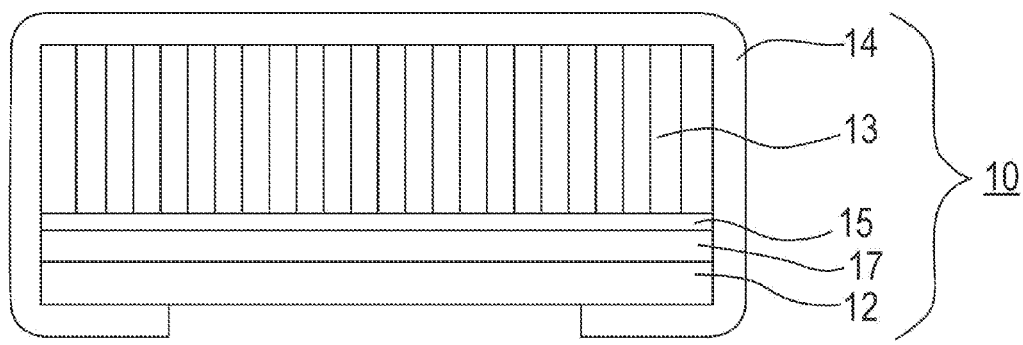
FIG. 1 is a cross-sectional view schematically illustrating a scintillator panel according to an embodiment of the present invention.

FIG. 1 is a cross-sectional view schematically illustrating a scintillator panel 10 according to an embodiment of the present invention.

The scintillator panel 10 includes a flexible substrate and a phosphor layer 13. The flexible substrate is used as a support member 12. The phosphor layer 13 is provided on one surface of the support member 12 by vapor deposition to form a phosphor layer surface.

Cesium iodide (CsI) contained in the phosphor layer is so hygroscopic that it absorbs moisture in the air to deliquesce when it is left exposed. Thus, in order to prevent the deliquescence, a moisture-impermeable protective layer (hereinafter also referred to simply as "protective layer") 14 is preferably provided. The protective layer 14 is preferably provided so as to cover at least the upper surface, the side surfaces, and a portion of the lower surface of the phosphor layer 13.

A reflection layer 15 is preferably provided on a surface on which the phosphor of the support member 12 is vapor deposited. Use of the reflection layer 15 permits light emitted from the phosphor to be efficiently extracted, and thus the brightness to be drastically improved.

Further, an intermediate layer is provided between the support member 12 and the reflection layer 15 to provide a tighter contact between the support member 12 and the reflection layer 15.

According to an embodiment of the present invention, a thermal expansion compensation layer 17 having a particular linear expansion coefficient is provided between the support member 12 and the phosphor layer 13. FIG. 1 shows an example in which the thermal expansion compensation layer 17 is provided on top of the support member 12, and the reflection layer 15 is provided on top of the thermal expansion compensation layer 17. However, the scope of the present invention is not limited to this arrangement.

Flexible Substrate

As uses herein, the term "substrate" refers to a member that serves as a support to hold the phosphor layer, of the components of the scintillator panel.

Examples of the material that can be used for forming the substrate include (1) carbon fiber reinforced plastics (CFRP), (2) carbons (amorphous carbon, a product formed by carbonization of charcoal and paper, and then solidification, etc.), (3) plastics, (4) glass, (5) metals, and (6) a product formed by sandwiching thin layers of a material (1) to (5) by foamed resin. These materials may be used alone or in a laminated form.

A scintillator panel according to an embodiment of the present invention uses a flexible substrate. The elasticity modulus of the flexible substrate is preferably 0.1 to 20 GPa. As used herein, the term "elasticity modulus" is intended to mean a slope of the stress with respect to the amount of strain obtained by a tensile testing machine when the amount of strain indicated by a marked line on the sample compliant to JIS C 2318 and the magnitude of the stress corresponding thereto have a linear relationship. This value is what is called Young's modulus. This Young's modulus is defined herein as the elasticity modulus.

The thickness of the substrate is preferably greater than or equal to 20 μm and less than or equal to 3 mm.

The substrate may be provided with a functional layer, such as an easily adhesive layer, a reflection layer, a light absorbing layer, an electrically conductive layer, a warpage prevention layer, or a smoothing layer.

In an embodiment of the present invention, a resin film is preferably used as the flexible substrate. Use of a resin film provides advantages in that, for example, (1) a functional layer, such as a reflection layer, an electrically conductive layer, or an easily adhesive layer, can be processed using a roll-to-roll process; (2) the substrate can be easily cut into a production size before or after the vapor deposition of the phosphor; and (3) a resin film provides a good contact with a planar light-receiving device due to its flexibility upon coupling the scintillator panel with the planar light-receiving device.

The resin film is a sheet that may be formed of, for example, polyethylene terephthalate, polyethylene naphthalate, cellulose acetate, polyamide, polyimide, polyetherimide, epoxy, polyamide-imide, bismaleimide, fluororesins, acrylic resins, polyurethane, aramide, nylon, polycarbonate, polyphenylene sulfide, polyether sulfone, polysulfone, polyether ether ketone, liquid crystal polymer, or carbon fiber reinforced resin. These materials may be used alone or in a stacked form.

The flexible substrate may be configured such that the surface of a thin film glass is coated with a resin layer. The resin layer is formed of the resin that forms the resin sheet described above.

The glass transition temperature is preferably higher than or equal to 100° C. to avoid thermal deformation of the support member during vapor deposition of phosphor onto the flexible substrate. More specifically, a resin film containing polyimide is preferred.

The thickness of the flexible substrate is preferably 20 to 1000 μm, and more preferably 50 to 750 μm. A thickness greater than or equal to 50 μm of the support member permits good handling after the phosphor layer is formed. Moreover, a thickness less than or equal to 750 μm of the support member facilitates a roll-to-roll process of a functional layer, such as a reflection layer, an electrically conductive layer, or an easily adhesive layer. This is very advantageous from a standpoint of productivity improvement.

<Reflection Layer>

The flexible substrate is preferably provided with a reflection layer 15 at least on the surface on which the phosphor layer 13 is vapor deposited. Use of the reflection layer 15 permits light emitted from the phosphor to be efficiently extracted, and thus the brightness to be drastically improved.

The surface reflectivity of the reflection layer 15 is preferably greater than or equal to 80%, and more preferably greater than or equal to 90%.

The material forming the reflection layer 15 preferably includes a metal material, such as aluminum, silver, platinum, palladium, gold, copper, iron, nickel, chromium, cobalt, or stainless steel. Among others, aluminum or silver is particularly preferably the main component thereof from a viewpoint of reflectivity and corrosion resistance. Two or more of such metal thin films may also be formed.

There is no limitation on how to coat the metal onto the support member 12. The method may be vapor deposition, sputtering, metal foil attachment, or the like. Among others, sputtering is most preferable from a viewpoint of close contact.

An intermediate layer is preferably provided between the support member 12 and the reflection layer 15 to provide a tighter contact between the support member 12 and the reflection layer 15. The intermediate layer may be formed of a common, easily adhesive polymer, or may be a different-metal layer formed of a metal different from that of the reflection layer 15. The different-metal layer is preferably formed of at least one metal selected from the group of, for example, nickel, cobalt, chromium, palladium, titanium, zirconium, molybdenum, and tungsten. Among others, nickel and/or chromium are more preferably used alone or in combination.

The thickness of the reflection layer 15 formed of these metals is preferably 0.005 to 0.3 μm, and more preferably 0.01 to 0.2 μm, from a viewpoint of light extraction efficiency with respect to the emitted light.

In an embodiment of the present invention, a high-reflection layer may be provided which is formed of a metal oxide, such as $SiO_2$ or $TiO_2$ to improve reflectivity.

In an embodiment of the present invention, the reflection layer 15 may be of a type in which light scattering particles are dispersed in a binder. Such type of reflection layer is referred to as an application-type reflection layer.

Examples of usable material for the light scattering particles include, for example, a white pigment, such as $TiO_2$ (anatase type and rutile type), MgO, $PbCO_3.Pb(OH)_2$, $BaSO_4$, $Al_2O_3$, M(II)FX (where M(II) is at least one atom selected from Ba, Sr, and Ca atoms; and X is a Cl or Br atom), $CaCO_3$, ZnO, $Sb_2O_3$, $SiO_2$, $ZrO_2$, lithopone ($BaSO_4.ZnS$), magnesium silicate, basic silicate sulfate, basic lead phosphate, and aluminum silicate. Having high hiding power and a high refractive index, these white pigments reflect and refract light, and thus easily scatter the light emitted from the scintillator, thereby significantly improving the sensitivity of the radiological image conversion panel that is obtained.

Examples of other light scattering particles that can be used include, for example, glass beads, resin beads, hollow particles having a hollow region in each particle, multi-hollow particles having many hollow regions in each particle, porous particles, and the like.

These materials of the light scattering particles may be used alone or in combination.

The crystal structure of titanium oxide may be either rutile type or anatase type. However, the rutile type is preferred from a viewpoint of high ratio to the refractive index of resin, and thus capability of achieving high brightness.

More specifically, examples of such titanium oxide particles include, for example, CR-50, CR-50-2, CR-57, CR-80, CR-90, CR-93, CR-95, CR-97, CR-60-2, CR-63, CR-67, CR-58, CR-58-2, and CR-85, which are produced using a hydrochloric acid process, and R-820, R-830, R-930, R-550, R-630, R-680, R-670, R-580, R-780, R-780-2, R-850, R-855, A-100, A-220, and W-10, which are produced using a sulfuric acid process (those listed are trade names, and products of Ishihara Sangyo Kaisha, Ltd.).

The primary particle size of the titanium oxide is preferably 0.1 to 0.5 μm, and more preferably 0.2 to 0.3 μm. Moreover, to improve affinity with the polymer and dispersing characteristics, and/or to reduce deterioration of the polymer, the titanium oxide is preferably surface treated with oxide of Al, Si, Zr, Zn, or the like.

Examples of preferred binder into which the light scattering particles are mixed to form the reflection layer 15, include easily adhesive polymers, such as, for example, polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (nitrocellulose etc.), styrene-butadiene copolymers, various synthetic rubber-based resins, phenolic resins, epoxy resins, urea resins, melamine resins, phenoxy resins, silicone resins, fluororesins, acrylic resins, and urea formamide resins. Among others, polyurethane, polyester, silicone resins, acrylic resins, and polyvinyl butyral are preferably used. Two or more of these binders may be used in combination.

The application-type reflection layer can be formed by application of a composition containing at least the light scattering particles, the binder, and a solvent, and then drying. There is no limitation on the application technique; a common technique, such as, for example, gravure coating, die coating, comma coating, bar coating, dip coating, spray coating, spin coating, or the like, can be used.

Examples of solvent used for producing the application-type reflection layer include, for example, lower alcohols, such as methanol, ethanol, n-propanol, and n-butanol; chlorine atom-containing hydrocarbons, such as methylene chloride and ethylene chloride; ketones, such as acetone, methyl ethyl ketone, and methyl isobutyl ketone; aromatic compounds, such as toluene, benzene, cyclohexane, cyclohexanone, and xylene; esters of lower fatty acids and lower alcohols, such as methyl acetate, ethyl acetate, and butyl acetate; ethers, such as dioxane, ethylene glycol monoethyl ether, ethylene glycol monomethyl ether, methoxypropanol (propylene glycol monomethyl ether), and propylene glycol monomethyl ether acetate; and a mixture thereof.

In order to improve dispersing characteristics of titanium oxide, a dispersant may be used. As a dispersant, for example, a polyalcohol, an amine, silicone, or a surfactant can be used.

The film thickness of such an application-type reflection layer is preferably 10 to 500 μm. A film thickness greater than or equal to 10 μm of the reflection layer ensures sufficient brightness, and a film thickness less than or equal to 500 μm provides a smoother surface of the reflection layer.

The content of the titanium oxide contained in an application-type reflection layer is preferably 40% to 95% by weight, and particularly preferably 60% to 90% by weight. A content greater than or equal to 40% by weight provides higher brightness, and a content less than or equal to 95% by weight improves adhesion to the support member and/or to the phosphor.

<Phosphor Layer>

Various phosphor materials are known as a material usable for the phosphor layer 13. Among others, cesium iodide (CsI) is preferable since CsI has a relatively high conversion ratio from an X-ray to visible light, and moreover, the phosphor can easily be formed into a columnar crystal structure by vapor deposition, which can reduce scattering of emitted light in crystals due to light-guiding effect, and thus permits the thickness of the phosphor layer 13 to be increased.

However, use of CsI alone achieves only a low light emission efficiency, and accordingly, various kinds of activators are added. For example, as described in JP 54-35060 B, sodium iodide (NaI) may be mixed with CsI in any molar ratio. Moreover, as disclosed in JP 2001-59899 A, it is preferable that an activating substance, such as thallium (Tl), europium (Eu), indium (In), lithium (Li), potassium (K), rubidium (Rb), and sodium (Na), be used together with CsI.

In an embodiment of the present invention, an additive containing one or more thallium compounds, and cesium iodide, are preferably used as the starting materials. Thallium-activated cesium iodide (CsI:Tl) has preferably a wide light emission wavelength ranging from 400 nm to 750 nm.

Various thallium compounds (compounds having oxidation numbers +I and +III) can be used as the thallium compound(s) in the additive that contains one or more thallium compounds according to an embodiment of the present invention. Examples of the thallium compound(s) include, for example, thallium iodide (TlI), thallium bromide (TlBr), thallium chloride (TlCl), and thallium fluoride (TlF, $TlF_3$). In an embodiment of the present invention, thallium iodide (TlI) is preferred.

The melting point of a thallium compound according to an embodiment of the present invention is preferably in a rage from 400° C. to 700° C. A melting point at or above 700° C. causes the additive to be inhomogeneously distributed in the columnar crystals, and thus causes a decrease in light emission efficiency. Note that, as used herein, the term "melting point" is intended to mean a melting point at standard temperature and pressure.

The relative content of the activator in a phosphor layer according to an embodiment of the present invention is preferably 0.1% to 5% by mole.

The degree of orientation of a plane having constant crystal plane indices in the phosphor determined based on an X-ray diffraction spectrum is preferably in a range from 80% to 100% regardless of the position along the layer thickness direction. For example, the crystal plane indices of thallium-activated cesium iodide (CsI:Ti) may be any one of (100), (110), (111), (200), (211), (220), (311), etc., and (200) is preferred (for crystal plane indices, see Introduction to X-Ray Analysis, Tokyo Kagaku Dojin, pp. 42-46).

As used herein, the phrase "degree of orientation of a plane having constant crystal plane indices . . . determined based on an X-ray diffraction spectrum" is intended to mean a ratio of the intensity Ix of a specific set of crystal plane indices with respect to the total intensity I of the entirety including planes having other sets of crystal plane indices. For example, the degree of orientation of intensity I200 for a (200) plane in an X-ray diffraction spectrum is I200/I.

One method for measuring crystal plane indices for determining the degree of orientation is, for example, X-ray diffraction (XRD). X-ray diffraction is a general-purpose analysis technique, in which a characteristic X-ray having a specific wavelength is emitted to a crystalline substance to cause diffraction satisfying Bragg's equation, and by using this phenomenon, the substance can be identified, and information on the structure of crystal phase can be obtained. Cu, Fe, Co, or other substance is used as the target of the radiation system, which has output of about 0 to 50 mA and about 0 to 50 kV in general upon emission, though these values may vary depending on the system capability.

The phosphor layer 13 preferably has a columnar crystal structure, which can reduce scattering of emitted light in crystals as a result of the light-guiding effect. One possible method for forming a columnar crystal is vapor phase deposition. Examples of usable vapor phase deposition method include methods such as vapor deposition, sputtering, chemical vapor deposition (CVD), and ion plating. In an embodiment of the present invention, vapor deposition is preferred among others.

The phosphor layer 13 is preferably formed of a phosphor containing a phosphor matrix compound and an activator. In addition, an underlayer that contains a phosphor matrix compound and an activator, and has a void ratio higher than that of the phosphor layer 13 is preferably provided between the substrate (support member 12) and the phosphor layer 13.

The phosphor layer 13 can be divided into two parts: a first phosphor layer that is formed before the columnar crystals of the phosphor have grown to a film thickness of about 50 μm during a process of columnar crystal formation of the phosphor, and a second phosphor layer, which is the remaining part. In particular, the first phosphor layer is also referred to as "underlayer." The material that forms the phosphor layer is referred to as "phosphor material" or simply "phosphor." The phosphor material, or simply phosphor, refers to either a phosphor matrix compound alone or a composition of a phosphor matrix compound and an activator.

The relative content of the activator in the underlayer is preferably 0.01% to 1% by mole, and more preferably 0.1% to 0.7% by mole. Here, the relative content of an activator is represented by percentage (%) by mole of the activator in one mole of the phosphor matrix compound. In particular, it is important that the underlayer contains 0.01% by mole or more of activator from the viewpoint of improvement in light emission brightness and of good storage stability. In an embodiment of the present invention, the relative content of the activator in the underlayer needs to be lower than the relative content thereof in the phosphor layer. The ratio of the relative content of the activator in the underlayer to the relative content of the activator in the phosphor layer ("relative content of activator in underlayer"/"relative content of activator in phosphor layer") is preferably 0.1 to 0.7.

The thickness of the phosphor layer 13 is preferably 100 to 800 μm, and more preferably 120 to 700 μm for good balance between brightness and sharpness. From the viewpoint of keeping high brightness and sharpness, the thickness of the underlayer is preferably 0.1 to 50 μm, and more preferably 5 to 40 μm.

The method for forming columnar crystals of the phosphor can be a publicly known method, and an embodiment of the method preferably includes a step of forming, on a surface of the substrate, an underlayer having a void ratio lower than that of the phosphor layer, and a step of forming a phosphor on a surface of the underlayer using a vapor phase deposition technique.

<Thermal Expansion Compensation Layer>

In an embodiment of the present invention, a thermal expansion compensation layer 17 is provided between the support member 12, which is formed of a flexible base material, and the phosphor layer 13.

The linear expansion coefficient of the thermal expansion compensation layer 17 is higher than the thermal expansion coefficient of the phosphor. Thus, the thermal expansion compensation layer 17 is formed of a highly thermally expandable material. The thermal expansion compensation layer 17 is formed to cover a root of each columnar crystal of the phosphor. Formation of such a thermal expansion compensation layer prevents or reduces crack formation in the phosphor. While its mechanism is unclear, considering the higher thermal expandability than that of the phosphor, it is likely that the thermal expansion compensation layer compresses the roots of the columnar crystals of the phosphor upon expansion, thereby prevents or reduces crack formation in the phosphor.

The material that forms the thermal expansion compensation layer 17 preferably has high affinity and adhesion to the substrate. Forming the substrate and the thermal expansion compensation layer 17 using such organic material reduces warpage due to heat generated by the scintillator, and also can prevent separation of the phosphor.

Examples of the resin material to form the thermal expansion compensation layer described above includes easily adhesive polymers, such as, for example, polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (nitrocellulose etc.), styrene-butadiene copolymers, various synthetic rubber-based resins, phenolic resins, epoxy resins, urea resins, melamine resins, phenoxy resins, silicone resins, acrylic resins, and urea formamide resins. Among others, polyurethane, polyester, silicone resins, fluororesins, acrylic resins, and polyvinyl butyral are preferably used. Two or more of these materials may be used in combination.

A material having high adhesion to the flexible substrate described above is selected, for use, from the resins listed above.

The thermal expansion compensation layer 17 may contain a filler. Addition of a filler permits the linear expansion coefficient of the thermal expansion compensation layer 17 to be controlled.

The filler used in an embodiment of the present invention can be appropriately selected, for use, from publicly known inorganic or organic powders. Examples of inorganic powders include, for example, titanium oxide, boron nitride, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, synthetic diamond, garnet, mica, silica stone, silicon nitride, and silicon carbide. Examples of organic powders include, for example, three-dimensionally crosslinked polymethyl methacrylate, polystyrene, Teflon®, and the like. These inorganic powders may be surface treated.

The average particle size of the organic or inorganic powders used as the filler is typically in a range from 0.5 to 8.0 µm, preferably from 1.0 to 6.0 µm, and more preferably from 2.0 to 5.0 µm. If a plurality of materials of powders are added, both methods may be used in combination. The composition of the thermal expansion compensation layer 17 is adjusted depending on the thermal expansion coefficient to be achieved. The thermal expansion compensation layer 17 may be a lamination of two or more layers.

The thermal expansion compensation layer 17 according to an embodiment of the present invention has a thermal expansion coefficient greater than that of the phosphor layer. While there is no limitation on the thermal expansion coefficient of the flexible substrate according to an embodiment of the present invention, such thermal expansion coefficient is typically less than that of the thermal expansion compensation layer 17.

The thickness of the thermal expansion compensation layer 17 is preferably greater than or equal to 1 µm, and less than or equal to 100 µm, and more preferably greater than or equal to 1 µm, and less than or equal to 60 µm. The thermal expansion compensation layer 17 having a thickness within these ranges can relax the stress associated with warpage under heat. The thermal expansion compensation layer 17 may further contain a pigment or dye to prevent scattering of light emitted from the phosphor (scintillator), and to improve sharpness and the like.

<Moisture-Impermeable Protective Layer>

The light emitting surface and side surfaces of the phosphor, and the side surfaces and a portion of the lower surface of the flexible substrate are preferably covered with the moisture-impermeable protective layer 14.

The moisture-impermeable protective layer 14 may be formed of a single material, of a mixture material, or of a plurality of films made of different materials, or the like, in combination.

The main purpose of the moisture-impermeable protective layer 14 is to protect the phosphor. More specifically, if the phosphor is cesium iodide (CsI), highly hygroscopic CsI absorbs moisture in the air to deliquesce when it is left exposed, and thus the moisture-impermeable protective layer 14 is provided to prevent such deliquescence. The protective layer 14 also has a function to block substance (e.g., halogen ion) released from the phosphor in the scintillator panel, and thus to prevent corrosion on the light-receiving device side caused by contact between the scintillator layer and the light-receiving device.

In an embodiment of the present invention, if the scintillator layer formed from columnar crystals of the phosphor in the scintillator panel is bonded with the photoelectric light-receiving device using, for example, adhesive or immersion oil, the protective layer 14 also serves as a penetration prevention layer that prevents the adhesive or immersion oil from penetrating into columnar crystals of the phosphor.

The protective layer 14 can be formed using various materials. According to an embodiment of the present invention, the protective layer 14 can be formed using a polyolefin-, polyacetal-, epoxy-, polyimide-, silicone-, or poly(para-xylylene)-based material. Since poly(para-xylylene)-based materials can be formed using a CVD process, and permit little water vapor and gas to penetrate, these materials are essentially suitable to use for a protection film for deliquescent CsI:Tl. As used herein, the term "poly(para-xylylene)" includes not only poly(para-xylylene) itself, but also poly(monochloro-para-xylylene) poly(monochloro-para-xylylene), poly(dichloro-para-xylylene), poly(tetrachloro-para-xylylene), poly(fluoro-para-xylylene), poly(tetrachloro-para-xylylene), poly(fluoro-para-xylylene), poly(dimethyl-para-xylylene), poly(diethyl-para-xylylene), and the like.

If a moisture-impermeable protective layer formed of poly(para-xylylene) is formed, the layer thickness thereof is preferably greater than or equal to 2 µm, and less than or equal to 15 µm. If the protective layer is adhered to the light-receiving device, and an adhesive layer is then formed, the thickness of that adhesive layer is preferably greater than or equal to 10 µm from the viewpoint of ensuring sufficient adhesion, and the total thickness of the protective layer and the adhesive layer is preferably less than or equal to 20 µm. When the total thickness of the poly(para-xylylene) film and the adhesive layer is less than or equal to 20 µm, the emitted light is prevented from diverging between the planar light-receiving device and the scintillator panel, and thus reduction in sharpness is suitably prevented in a configuration in which the protective layer is adhered to the light-receiving device.

The protective layer 14 may be formed by laminating an inorganic substance, such as SiC, $SiO_2$, SiN, or $Al_2O_3$ by vapor deposition, sputtering, or other technique.

According to another aspect of the present invention, a layer of hot-melt resin on the phosphor layer 13 may be used as the protective layer 14. The hot-melt resin can also serve as adhesive between the scintillator panel and the planar light-receiving device surface.

As used herein, the term "hot-melt resin" refers to an adhesive resin that includes no water or solvent, is solid at room temperature, and is formed of non-volatile thermoplastic material. The resin melts when the resin temperature rises, and solidifies when the resin temperature decreases. In addition, the resin has adhesion in heated molten state, and is in a solid state without adhesion at ordinary temperature. From the viewpoint of light permeability, a polyolefin-based resin is preferred.

The hot-melt resin preferably primarily contains a polyolefin-, polyester-, or polyamide-based resin, but is not limited to such compositions. The thickness of the hot-melt resin is preferably less than or equal to 20 µm.

The melting onset temperature of the hot-melt resin is preferably 60° C. or higher and 150° C. or lower from the viewpoint of continuous function characteristic in a planar light-receiving device such as TFT, and of resistance to adhesive removal. The melting onset temperature of the hot-melt resin is adjustable by adding plasticizer.

One method for forming the protective layer 14 from hot-melt resin is, for example, as follows. A release sheet coated with a release agent is prepared. A hot-melt resin is applied on the release sheet. The surface of the hot-melt resin is positioned over the phosphor layer surface of the scintillator panel, and is then attached to that surface while being pressed with a heated roller. After cooling, the release sheet is removed.

Alternatively, the method may be performed as follows. The hot-melt resin is applied on a sheet, and the sheet is positioned over the phosphor layer surface. Resin films are then respectively placed over and under the resultant. After sealing the peripheral edges of these upper and lower films under a low pressure, heating is performed at atmospheric pressure.

The resin film is preferably a dry laminate film including a sealant film and polyethylene terephthalate (PET), etc., and is more preferable since atmospheric pressure causes uniform adhesion pressure on the entire phosphor layer surface.

High moisture impermeability is achieved by covering, with poly(para-xylylene), the upper surface and side surfaces of the scintillator layer (phosphor layer of FIG. 1), and the outer peripheral portions of the scintillator layer of the support member. A hot-melt resin not only provides moisture impermeability, but also serves as adhesive between the scintillator panel and the planar light-receiving device surface.

From the viewpoint of absorbing impact, forming a resin layer that penetrates into, to some extent, columnar crystals of the phosphor, as poly(para-xylylene) and a hot-melt resin do, is preferred. In contrast, from the viewpoint of sharpness, forming a resin layer that does not penetrate much into columnar crystals of the phosphor is preferred.

According to another aspect of the present invention, a protective layer 14 may be a macromolecule film (also referred to "as protective film") over the phosphor layer. The material of the macromolecule film may be a film similar to the macromolecule film used as that of support member (substrate).

The thickness of the macromolecule film is preferably in a range from 12 µm to 120 µm, and more preferably from 20 µm to 80 µm, considering formability of voids, protection of the phosphor layer, sharpness, moisture impermeability, workability, and the like.

The haze value is preferably in a range from 3% to 40%, and more preferably 3% to 10% considering sharpness, unevenness of radiological images, manufacturing stability, workability, and the like. A haze value is shown using a value measured by NDH 5000W from Nippon Denshoku Industries Co., Ltd. A required haze value is easily achievable by appropriately selecting one from commercially available macromolecule films.

The light transmittance of the macromolecule film is preferably greater than or equal to 70% at a wavelength of 550 nm considering the photoelectric conversion efficiency, the wavelength of light emitted from the phosphor (scintillator), and other factor. In practice, a film having a light transmittance of or above 99% is industrially unavailable, and thus the light transmittance is preferably 99% to 70% in practice.

The moisture permeability of the protective film is preferably less than or equal to 50 g/m²·day (40° C., 90% RH) (as measured in compliance with JIS Z0208), and more preferably less than or equal to 10 g/m²·day (40° C., 90% RH) (as measured in compliance with JIS Z0208), considering protection and deliquescence of the phosphor layer and other factor. In practice, a film having moisture permeability less than or equal to 0.01 g/m²·day (40° C., 90% RH) is industrially unavailable, and thus the moisture permeability is preferably in a range from 0.01 g/m²·day (40° C., 90% RH) to 50 g/m²·day (40° C., 90% RH) (as measured in compliance with JIS 20208), and more preferably from 0.1 g/m²·day (40° C., 90% RH) to 10 g/m²·day (40° C., 90% RH) (as measured in compliance with JIS 20208) in practice.

<Optical Compensation Layer>

A portion including upper edges of the columnar crystals of the phosphor is preferably provided with an optical compensation layer.

A plurality of photoelectric conversion devices and the like are provided with a smoothing layer thereover for smoothing irregularities of the surface caused by such devices, by applying a transparent resin and the like such as acrylic resin.

The phosphor of the scintillator abuts a surface of the smoothing layer. An optical compensation layer reduces the difference between the refractive index of the columnar crystals of the phosphor and that of the optical compensation layer, and the difference between the refractive index of the optical compensation layer and that of the smoothing layer, and thus reduces the degrees to which light that is emitted in the phosphor in response to an incident radiation is reflected on the boundary between the columnar crystals of the phosphor and the optical compensation layer, and on the boundary between the optical compensation layer and the smoothing layer.

Thus, there is a reduction in the degree to which the light emitted in the phosphor in the scintillator is reflected along the surface directions. This results in a reduction in the amount of light received by photoelectric conversion devices other than the photoelectric conversion device directly below the phosphor. Moreover, absorption of reflected light by the phosphor and the like is successfully prevented. Thus, almost the entire amount of light is incident on the photoelectric conversion device directly below the phosphor, and therefore a highly sharp radiological image can be obtained with high sensitivity.

The optical compensation layer is formed of thermosetting resin. Examples of preferred thermosetting resin include acrylic resins, epoxy resins, and silicone resins. The optical compensation layer may be formed of transparent liquid or gel-like material, instead of a solid material such as cured resin.

The optical compensation layer is preferably formed using an adhesive. Examples of usable adhesive include, for example, acrylic-, epoxy-, and silicone-based adhesives that cure at ordinary temperature. In particular, a rubber adhesive can be used as an elastic adhesive resin.

Examples of usable resin for a rubber adhesive include block copolymers such as styrene-isoprene-styrene; synthetic rubber adhesives such as polybutadiene and polybutylene; and natural rubbers. One example of preferably used, commercially available rubber adhesive is one-component RTV rubber KE-420 (product from Shin-Etsu Chemical Co., Ltd.).

<Method of Producing Scintillator Panel>

A scintillator panel according to an embodiment of the present invention is produced by disposing the thermal expansion compensation layer 17 over the support member 12, and further forming the phosphor layer 13 thereover.

The thermal expansion compensation layer 17 is formed by, for example, dissolving or dispersing a polymer material that is a component of the thermal expansion compensation layer 17, plus filler etc. as needed, in a solvent to prepare a composition; applying the resultant composition; and drying the resultant. There is no limitation on the application technique; a common technique, such as, for example, gravure coating, die coating, comma coating, bar coating, dip coating, spray coating, spin coating, or the like, can be used.

Examples of solvent include, for example, lower alcohols, such as methanol, ethanol, n-propanol, and n-butanol; chlorine atom-containing hydrocarbons, such as methylene chloride and ethylene chloride; ketones, such as acetone, methyl ethyl ketone, and methyl isobutyl ketone; aromatic compounds, such as toluene, benzene, cyclohexane, cyclohexanone, and xylene; esters of lower fatty acids and lower alcohols, such as methyl acetate, ethyl acetate, and butyl acetate; ethers, such as dioxane, ethylene glycol monoethyl ether, ethylene glycol monomethyl ether, methoxypropanol (propylene glycol monomethyl ether), and propylene glycol monomethyl ether acetate; and a mixture thereof. There is no limitation on the method of forming the reflection layer 15 over the support member 12, and the method may be vapor deposition, sputtering, metal foil attachment, or the like. Among others, sputtering is most preferable from a viewpoint of close contact. In an embodiment of the present invention, an application-type reflection layer can be formed by applying a composition containing at least light scattering particles, a binder, and a solvent, and then drying the resultant. There is no limitation on the application technique; a common technique, such as, for example, gravure coating, die coating, comma coating, bar coating, dip coating, spray coating, spin coating, or the like, can be used.

A scintillator panel according to an embodiment of the present invention is preferably produced in such a manner that the phosphor layer 13 is formed using a vapor phase deposition technique that includes a step using a vapor deposition apparatus having an evaporation source and a support member rotation mechanism in a thermal vacuum chamber, in which step the flexible substrate, as the support member 12, having the thermal expansion compensation layer 17 etc. formed thereover as described above, is placed in the support member rotation mechanism, and the phosphor material is vapor deposited during rotation of the support member 12.

Figure 2:
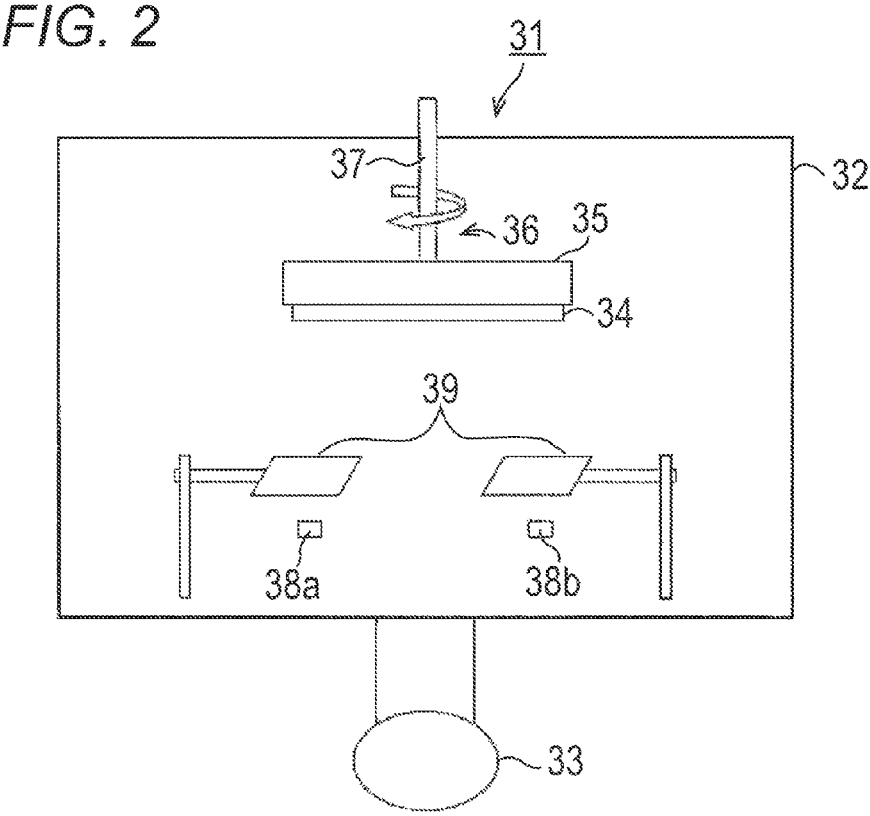
FIG. 2 is a schematic diagram of an embodiment of an apparatus for use in forming a phosphor layer.

One embodiment of the present invention will be described below with reference to FIG. 2. A production apparatus 31 includes a vacuum chamber 32, a support member 34, a support member holder 35, and evaporation sources 38a and 38b.

The evaporation sources 38a and 38b are disposed facing each other on the circumference of a circle centered about a center axis perpendicular to the support member 34, near the bottom inside the vacuum chamber 32. In this configuration, the distance between the support member 34 and each of the evaporation sources 38a and 38b is preferably in a range from 100 to 1500 mm, and more preferably from 200 to 1000 mm. The distance between the center axis perpendicular to the support member 34 and each of the evaporation sources 38a and 38b is preferably in a range from 100 to 1500 mm, and more preferably from 200 to 1000 mm.

The production apparatus 31 may include three or more (e.g., eight, sixteen, 24, etc.) evaporation sources. In such cases, the evaporation sources may be spaced substantially equidistantly or at different intervals. The radius of the circle centered about the center axis perpendicular to the support member 34 may be arbitrarily determined.

Due to their configuration that houses and heats the phosphor via resistance heating, the evaporation sources 38a and 38b may each be in a form of alumina crucible with a heater wound thereon, or be a boat, or a heater made of high melting point metal. The method of heating the phosphor may also be electron beam heating, high frequency induction heating, or other technique, instead of resistance heating. However, according to an embodiment of the present invention, preference is given to resistance heating in which current is directly flown through, or indirect resistance heating in which the crucible is heated by a surrounding heater, from a viewpoint of easy handling with a relatively simple setup, low cost, and applicability to very many materials. The evaporation sources 38a and 38b may be molecular beam sources for molecular beam epitaxy.

The production method described above provides the plurality of evaporation sources 38a and 38b to permit merged vapor flows from the evaporation sources 38a and 38b to be straightened, and thus the phosphor that is vapor deposited on the surface of the support member 34 can have uniform crystallinity. In this regard, a larger number of evaporation sources would straighten the vapor flow at more locations, thereby permitting the phosphor to have uniform crystallinity in a broader region. Moreover, the arrangement of the evaporation sources 38a and 38b being disposed on the circumference of a circle centered about a center axis perpendicular to the support member 34 permits the effect on achieving uniform crystallinity by straightening of the vapor flow to be isotropically obtained over the surface of the support member 34.

The support member holder 35 is configured to hold the support member 34 so that the surface, of the support member 34, over which the phosphor layer is formed faces the bottom of the vacuum chamber 32, and is parallel to the bottom of the vacuum chamber 32.

The support member holder 35 is preferably provided with a heater (not shown) for heating the support member 34. By heating the support member 34 by the heater, contact of the support member 34 with the support member holder 35 is improved, and the film quality of the phosphor layer is adjusted. In addition, adsorbate on the surface of the support member 34 is separated and removed to prevent an impurity layer from being generated between the surface of the support member 34 and the phosphor.

A mechanism (not shown) for circulating a hot medium or heating medium may also be provided as heating means. This type of heating means is suitable for maintaining the temperature of the support member 34 during the vapor deposition process of the phosphor at a relatively low temperature ranging from 50° C. to 150° C. for performing vapor deposition.

Alternatively, a halogen lamp (not shown) may be provided as heating means. This type of heating means is suitable for maintaining the temperature of the support member 34 during the vapor deposition process of the phosphor at a relatively high temperature at or above 150° C. for performing vapor deposition.

The support member holder 35 is further provided with a support member rotating mechanism 36 for horizontally rotating the support member 34. The support member rotating mechanism 36 supports the support member holder 35, and includes a support member rotating axis 37 that rotates the support member 34, and a motor (not shown) that drives the support member rotating axis 37, disposed outside the vacuum chamber 32.

The vapor deposition apparatus also includes a vacuum pump 33 in the vacuum chamber 32 in addition to the components described above. The vacuum pump evacuates gas that remains in the vacuum chamber 32. Two or more vacuum pumps having different working pressure ranges may be used in combination to achieve a high vacuum. Examples of possible vacuum pump include a rotary pump, a turbo molecular pump, a cryopump, a diffusion pump, and a mechanical booster pump.

A mechanism capable of introducing gas into the vacuum chamber 32 is provided to adjust the pressure in the chamber. The gas to be introduced is generally inert gas such as, for example, Ne, Ar, or Kr. The pressure in the vacuum chamber 32 may be adjusted by the amount of gas introduced during evacuation of the vacuum chamber 32 using the vacuum pump, or adjusted in such a manner that a higher vacuum than a predetermined pressure is provided by vacuum evacuation, after which the vacuum evacuation is stopped, and gas is then introduced to provide the predetermined pressure. A pressure control valve may be further provided between the vacuum chamber 32 and the vacuum pump to adjust the amount of pump evacuation, and thus to adjust the pressure in the vacuum chamber 32. The pressure in the vacuum chamber 32 may be adjusted by other means than a pressure control valve.

The vacuum chamber 32 further includes horizontally openable and closable shutters 39 that respectively block the paths from the evaporation sources 38a and 38b to the support member 34, between the evaporation sources 38a and 38b and the support member 34. Thus, even when a substance other than the intended substance (s) adhered to a surface of the phosphor evaporates at an early stage of the vapor deposition process in the evaporation sources 38a and 38b, these shutters 39 prevent such a substance from adhering to the support member 34.

A method of producing a scintillator panel according to an embodiment of the present invention using the production apparatus 31 will be described below.

First, the support member 34 is attached to the support member holder 35. The evaporation sources 38a and 38b are placed on the circumference of a circle centered about a center axis perpendicular to the support member 34 near the bottom of the vacuum chamber 32. Next, two or more phosphor matrix compounds (CsI: without activator) and an activator (TlI) are placed in the crucibles, boats, or any applicable components, and the crucibles etc. are set in the evaporation sources.

In order to remove impurities contained in the phosphor matrix compounds and the activator that are placed in the evaporation sources before performing the vapor deposition, preheating may be performed. It is desirable that the preheat temperature be lower than or equal to the melting point of the used material. In a case of CsI, for example, the preheat temperature is preferably 50° C. to 550° C., and more preferably 100° C. to 500° C. For TlI, the preheat temperature is preferably 50° C. to 500° C., and more preferably 100° C. to 500° C.

After the vapor deposition apparatus is once evacuated, and the vacuum level is adjusted by introducing Ar gas, rotation of the substrate is started. Although it may vary depending on the size of the apparatus, the rotational speed of the substrate is preferably 2 to 15 revolutions per minute (rpm), and more preferably 4 to 10 rpm. Next, the crucible of the phosphor matrix compound (CsI: without activator) is heated to vapor deposit the phosphor, and the underlayer (first phosphor layer) is thus formed. The substrate temperature during this process is preferably 5° C. to 100° C., and more preferably 15° C. to 50° C. Although it may vary depending on the average crystal diameter and/or the thickness of the phosphor layer, the thickness of the underlayer is preferably 0.1 to 50 μm. Then, heating of the substrate is started to raise the substrate temperature to a temperature ranging from 150° C. to 250° C., and evaporation of the phosphor matrix compound (CsI: without activator) and the activator (TlI) in the other crucible is started. In this process, the phosphor matrix compounds are preferably evaporated at a vapor deposition rate higher than that for the underlayer in consideration of productivity. Although it may vary depending on the thickness of the underlayer and the thickness of the phosphor layer, the vapor deposition rate is preferably 5 to 100 times higher, and more preferably 10 to 50 times higher, than that of the underlayer vapor deposition. The activator may be evaporated alone, or in such a manner that an evaporation source of a mixture of CsI and TlI is prepared, and only TlI is allowed to evaporate by heating the mixture to a temperature (e.g., 500° C.) at which CsI will not evaporate and only TlI will evaporate.

Since the support member 34 is hot due to heating during the vapor deposition process, the support member 34 needs to be cooled before taking out. Cooling can be accomplished without damaging the substrate by regulating the average cooling rate within a range from 0.5 to 10° C./min. while the phosphor layer is cooled to a temperature of 80° C. This consideration is particularly effective when a relatively thin substrate, such as, for example, a macromolecule film having a thickness greater than or equal to 50 μm and less than or equal to 500 μm is used as the support member 34. The cooling process is particularly preferably performed under an atmosphere having a vacuum level of $1 \cdot 10^{-5}$ Pa to 0.1 Pa. Inert gas such as Ar or He may be introduced into the vacuum chamber 32 of the vapor deposition apparatus during the cooling process. As used herein, the term "average cooling rate" is the temperature decrease per minute based on the time and temperature that are continuously measured during the time period from the start of cooling (end of vapor deposition) until the temperature decreases to 80° C.

The phosphor layer may be thermally treated after vapor deposition. The vapor deposition may be reactive vapor deposition in which vapor deposition is performed by introducing gas such as $O_2$ or $H_2$ as needed.

As far as the method of producing a scintillator panel is concerned, it is preferable that a support member larger than the product size be prepared, and a phosphor layer larger than the product size be formed on that support member, and that the support member and the phosphor layer be cut to the product size. Cutting the support member having the phosphor layer formed thereover into a plurality of phosphor layer-formed support members can improve productivity.

The plurality of phosphor layer-formed support members described above may be cut out by using, for example, a punching die, a force-cutting blade, a utility knife, scissors, laser light, or the like.

The protective layer according to an embodiment of the present invention is as described above, and is a layer for improving prevention of damages such as crystal cracks in columnar crystals of the phosphor layer, and for improving moisture impermeability.

The protective layer may be formed by attaching a film, or by laminating an inorganic material by sputtering or other technique.

Figure 3:
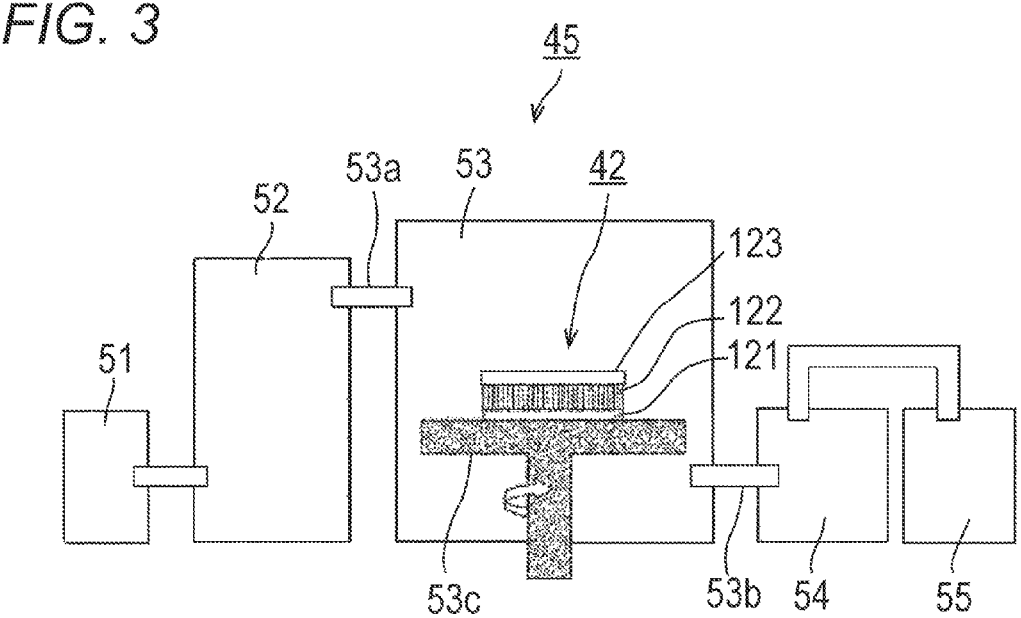
FIG. 3 is a schematic cross-sectional view of an embodiment of an apparatus for use in forming a protective layer.

FIG. 3 is a schematic cross-sectional view of an embodiment of an apparatus for use in forming the protective layer. FIG. 3 illustrates an example of forming the protective layer formed of a poly(para-xylylene) film over a surface of a phosphor layer 122 of a scintillator panel 42.

A CVD vapor deposition apparatus 45 includes a vaporization chamber 51, a thermal decomposition chamber 52, a vapor deposition chamber 53, a cooling chamber 54, and an exhaust system 55. The vaporization chamber 51 introduces and vaporizes di-para-xylylene, which is the starting material for poly(para-xylylene). The thermal decomposition chamber 52 heats the vaporized di-para-xylylene to form radicals. The vapor deposition chamber 53 vapor deposits di-para-xylylene in free radical formation on the phosphor layer 122 in which a scintillator is formed, on a support member 121. The cooling chamber 54 performs deodorization and cooling. The exhaust system 55 includes a vacuum pump. In this example, the vapor deposition chamber 53 includes, as shown in FIG. 3, an inlet 53a that introduces the poly(para-xylylene) radicalized in the thermal decomposition chamber 52, an outlet 53b that discharges excess poly(para-xylylene), and a turntable (vapor deposition table) 53c that supports a sample on which a poly(para-xylylene) film is to be vapor deposited.

First, the scintillator panel 42 is placed, with the phosphor layer 122 facing up, on the turntable 53c of the vapor deposition chamber 53.

Next, the di-para-xylylene is heated to a temperature of 175° C. to vaporize in the vaporization chamber 51, and is then heated to a temperature of 690° C. to form radicals in the thermal decomposition chamber 52. The resultant di-para-xylylene in free radical formation is introduced through the inlet 53a to the vapor deposition chamber 53, and the protective layer (poly(para-xylylene) film) 123 is vapor deposited on the phosphor layer 122 to a thickness of 3 μm. During this process, the pressure in the vapor deposition chamber 53 is maintained at a vacuum level of 13 Pa, and the turntable 53c is rotated at a rotational speed of 4 rpm. Excess poly(para-xylylene) is discharged through the outlet 53b, and is directed to the cooling chamber 54 for deodorization and cooling, and then to the exhaust system 55 having the vacuum pump.

Alternatively, the protective layer 123 may be formed in such a manner that, after hot-melt resin is applied on a release sheet coated with a release agent, the hot-melt resin surface is positioned over the phosphor layer surface of the scintillator panel 42, and is then attached to that surface by pressing using a roller heated to a temperature of 120° C. If adhesive is used for attachment to the planar light-receiving device surface, the thickness of the protective layer 123 is adjusted so that the total thickness of the protective layer 123 and the adhesive layer will be 20 μm or less. The protective layer formation process may be performed after the cutting process of the scintillator panel 42.

Radiation Detector

A radiation detector according to an embodiment of the present invention utilizes the scintillator panel described above as a line sensor. The radiation detector includes a scintillator that converts an incident radiation into light, and a light detector that converts the light output from the scintillator into an electrical signal. Such a radiation detector is a device for detecting a predetermined radiation that has transmitted through an object to be examined. By using the radiation detector, a radiological image can be obtained, and a predetermined process (e.g., weighted subtraction, combining, etc.) can then be performed on the radiological image to generate a processed image, which is useful for providing detection of a foreign matter, determination of component distribution, measurement of weight, and/or the like with high accuracy during a nondestructive test of an examined object that is conveyed by a belt conveyor etc. (i.e., inline nondestructive test).

The radiation detector is produced, for example, as shown in FIGS. 4A to 4D. First, transparent adhesive 6 is applied either on the light emitting surface of the scintillator 5 or on the light receiving surface of the photoelectric conversion panel 4 that converts light into an electrical signal.

If the transparent adhesive 6 is of a two-component mixture type, to which a hardener is added, or if a spacer is mixed to control the application thickness, then it is desirable that bubbles generated upon mixture be removed.

A vacuum degassing process needs to be performed before applying the transparent adhesive 6. The vacuum pressure during the degassing process is desirably less than that of the atmosphere for the vacuum attachment described below.

Examples of method of applying the adhesive include spin coating, screen printing, and a method using a dispenser. Large bubbles 25 are likely to occur when the scintillator is attached; however, attachment under a vacuum condition permits the sizes of the bubbles to be reduced when an atmospheric pressure is reapplied.

Figure 4A:
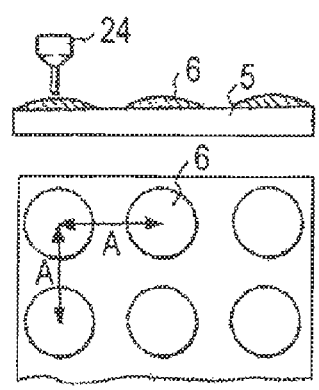
FIGS. 4A to 4D are schematic diagrams illustrating a production process of a radiation detector.
Figure 4C:
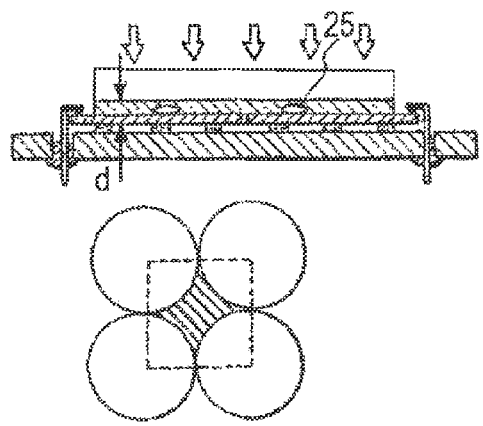
Figure 4B:
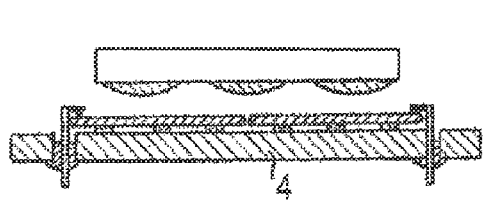
Figure 4D:
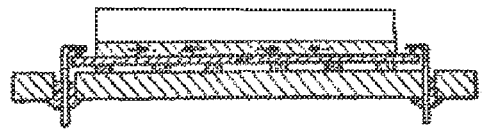

In order to ensure a correct amount and application form, the dispenser is preferably positioned so that the needle thereof is closely spaced with respect to the substrate of application target. Although the transparent adhesive 6 may be applied to either the scintillator 5 or the photoelectric conversion panel 4, considering the possibility that the needle comes into contact with the photoelectric conversion device unit 1 to break the semiconductor layer, it is desirable that the transparent adhesive 6 be applied to the surface of the scintillator 5 using a dispenser 24 as shown in FIG. 4A.

Although a predetermined amount of the transparent adhesive 6 is applied to achieve a predetermined thickness, a pressing pressure is desirably applied to the upper and lower substrates to facilitate the flow of the transparent adhesive 6. If the scintillator 5 contains CsI, the pressing pressure is desirably low in consideration of relatively low strength and low pressure resistance of CsI.

Considering attachment at a low pressing pressure, the transparent adhesive 6 preferably has a low viscosity, which is preferably less than or equal to 50 P. In the attachment process, a pressure of 10 to 500 g/cm² is applied until the adhesive hardens. If a hot-melt resin is used as the protective layer, the pressure of the ambient atmosphere is reduced from the atmospheric pressure P0 ($1.2 \cdot 10^5$ Pa) to P (Pa) while the pressure of 10 to 500 g/cm² is being applied.

According to another preferred embodiment of the present invention, the radiation detector includes the scintillator panel described above and a plurality of sensors. For example, as described in JP 2014-142292 A and in JP 2014-142217 A, a radiation detector of one preferred embodiment includes a sensor substrate having thereon a plurality of radiation detection elements arranged in a two-dimensional matrix, the sensor substrate having a smoothing layer formed thereon that covers the plurality of radiation detection elements; a scintillator substrate having a scintillator formed thereon that converts a radiation into light, the scintillator substrate arranged so that the scintillator and the plurality of radiation detection elements face each other; and an adhesive applied in portions around the plurality of radiation detection elements and the scintillator to bond together the sensor substrate and the scintillator substrate.

The present invention will now be further described with reference to the following specific examples which are to be regarded solely as illustrative and not as restricting the scope of the invention.

Example 1

Production of Support Member Having Thermal Expansion Compensation Layer

Polyester resin (VYLON 200, produced by Toyobo Co., Ltd.) solution dissolved in methyl ethyl ketone was applied on a polyimide film (UPILEX-125S produced by Ube Industries, Ltd.; linear expansion coefficient: 20 ppm/K) that was 125 μm thick, 1 m wide, and 100 m long, and the resultant film was dried to produce the thermal expansion compensation layer having a dry film thickness of 3.0 μm. Then, by cutting the product, a support member having the thermal expansion compensation layer formed thereon was produced. The linear expansion coefficient of the thermal expansion compensation layer was 130 ppm/K.

(Formation of Phosphor Layer)

A phosphor (CsI: 0.003 Tl; 0.003 moles of Tl for 1 mole of CsI) was vapor deposited on the surface of the support member having the thermal expansion compensation layer using a vapor deposition apparatus to form a phosphor layer. Then, these starting materials (CsI and TlI) of the phosphor were placed in a resistance-heated crucible (boat) as the vapor deposition material. A first support member was set in the metal frame of the rotary substrate holder, and the distance between the support member and the evaporation source was adjusted to 400 mm.

Subsequently, the vapor deposition apparatus was once evacuated, and after the vacuum level was adjusted to 0.5 Pa by introducing Ar gas, the temperature of the support member was maintained at 200° C. while the substrate was rotated at a rotational speed of 10 rpm. Then, the resistance-heated crucible (boat) was heated to perform vapor deposition on the phosphor, and the vapor deposition was terminated when a thickness of 350 μm was achieved. Thus, a scintillator panel having a phosphor layer formed thereon was obtained. The linear expansion coefficient of the phosphor layer was 45 ppm/K.

(Cutting and Adsorption)

Figure 5:
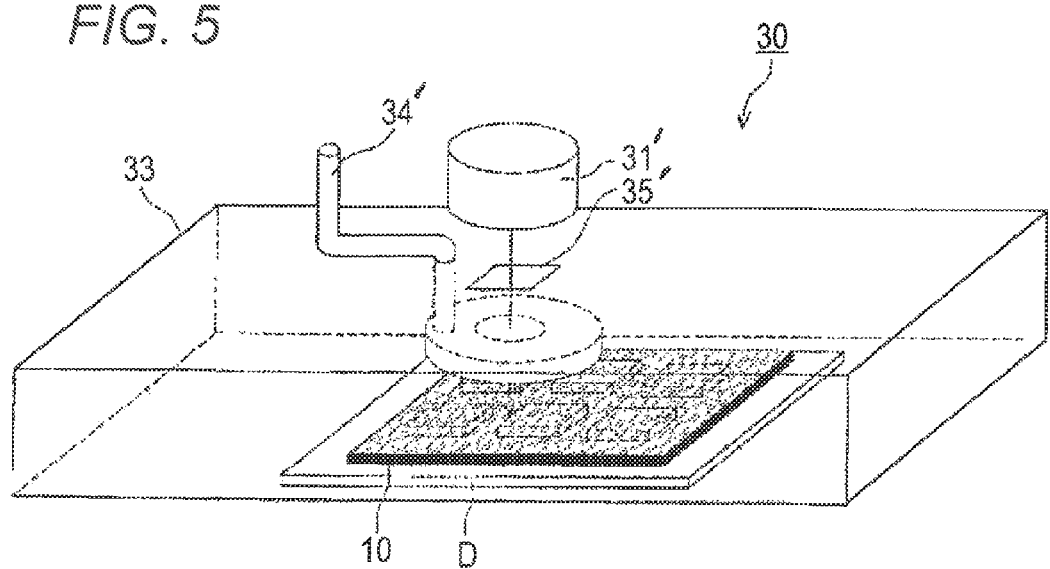
FIG. 5 is a schematic view of a laser-beam cutter (YAG-UV).

The scintillator panel 10 was placed, with the support member facing up, on a support table D of the laser-beam cutter (YAG-UV) shown in FIG. 5, and was cut into rectangular scintillator panels each having a size of 20 mm×200 mm. Cutter 30 has box shaped purge chamber 33 with discharged pipe 34' and translucent window 35' through which a laser beam from laser beam generator 31' is transmitted.

(Production of Protective Layer)

A polycarbonate substrate having the rectangular scintillator panels disposed thereon was placed in a vapor deposition chamber of a CVD apparatus, and was left exposed to vapor generated by sublimation of the starting material of poly(para-xylylene). Thus, a moisture-impermeable protective layer formed of poly(para-xylylene) having a thickness of 10 μm was formed on each of the rectangular scintillator panels.

Example 2

A filler was added to the thermal expansion compensation layer on the polyimide film having a thickness of 125 μm (UPILEX-125S produced by Ube Industries, Ltd.) during the process described in Production of Support Member Having Thermal Expansion Compensation Layer of Example 1, using the following procedure.

A scintillator panel according to an embodiment of the present invention was obtained in a similar manner to Example 1 except that: 40 parts by mass of rutile-type titanium dioxide having an average particle size of 0.2 μm, 10 parts by mass of polyester resin (VYLON 630, produced by Toyobo Co., Ltd.), and as the solvents, 25 parts by mass of toluene and 25 parts by mass of methyl ethyl ketone (MEK) were added, and the mixture was then dispersed by a sand mill to produce a filler-dispersed paint. The filler-dispersed paint was applied on the polyimide film substrate, which was then dried to produce a filler-containing thermal expansion compensation layer having a film thickness of 50 μm. The linear expansion coefficient of the thermal expansion compensation layer was 80 ppm/K.

Example 3

A scintillator panel according to an embodiment of the present invention was obtained in a similar manner to Example 1. However, a thermal expansion compensation layer formed by using a polyester resin, of Example 1, was further applied to, and formed over, the filler-containing thermal expansion compensation layer during the process to produce a support member having the filler-containing thermal expansion compensation layer of Example 2. The linear expansion coefficient of the laminate thermal expansion compensation layer was 100 ppm/K.

Comparative Example 1

A scintillator panel according to an embodiment of the present invention was obtained in a similar manner to Example 1. However, the polyimide film (UPILEX-125S produced by Ube Industries, Ltd.; linear expansion coefficient: 20 ppm/K) used in Example 1 was used as the support member without forming the thermal expansion compensation layer.

(Evaluation)

Obtained scintillator panels were examined for warpage and crack formation.

Warpage was measured in terms of the average value of rises of edges of rectangular scintillator panels placed on a smoothed plate.

Evaluation of crack formation was performed by visually inspecting the reflection films. The evaluation results are indicated as Not Permissible for an impracticable level, Tolerably Permissible for a practicable level but having adverse effect, and Permissible for a sufficiently practicable level.

These results are summarized in Table 1.

TABLE 1

| | Warpage | Crack |
|---|---|---|
| Comparative Example 1 | 1.5 cm | Not Permissible |
| Example 1 | 0.8 cm | Tolerably Permissible |
| Example 2 | 0.5 cm | Permissible |
| Example 3 | 0.3 cm | Permissible |

It was observed that the scintillator panel of Comparative Example 1, which is produced by vapor depositing a phosphor on a polyimide film having a linear expansion coefficient lower than that of the phosphor, exhibited separation of the phosphor from the substrate due to warpage of the scintillator panel, and had a large number of cracks in the phosphor itself. Accordingly, a yield factor could not be determined on a production basis. In contrast, Example 1 achieved a yield factor of 80%; Example 2, 87%; and Example 3, 90%. Thus, warpage reduction effects by the thermal expansion compensation layers were observed.

According to an embodiment of the present invention, a scintillator panel can be obtained that can prevent warpage and separation, crack formation of the phosphor, and the like due to heat, without using a rigid plate, a warpage prevention film, or similar means, and can be constantly in close contact with the photoelectric conversion device at a constant distance, by providing a thermal expansion compensation layer that is highly adhesive with the flexible substrate between the flexible substrate and the phosphor, and by providing control so that the thermal expansion coefficient of that layer is higher than the thermal expansion coefficient of the phosphor. Such advantage is likely to be caused by covering a root of the columnar phosphor with the thermal expansion compensation layer having a high linear expansion coefficient, thereby preventing deformation or the like of the phosphor caused by temperature fluctuation during a manufacturing process and/or in an environment.

A scintillator panel according to an embodiment of the present invention can be suitably used to forma radiation detector in which a light detection panel is provided to face the scintillator panel, which light detection panel includes photoelectric conversion devices arranged thereon in a two-dimensional matrix.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A scintillator panel comprising:
   a flexible substrate;
   a phosphor arranged on the flexible substrate; and
   a thermal expansion compensation layer disposed between the flexible substrate and the phosphor,
   wherein
   a linear expansion coefficient of the thermal expansion compensation layer is greater than a thermal expansion coefficient of the phosphor,
   surfaces, of the thermal expansion compensation layer and of the flexible substrate, in contact with each other each contain an organic substance, and
   the thermal expansion compensation layer contains a filler.

2. The scintillator panel according to claim 1, wherein a light emitting surface and side surfaces of the phosphor, and side surfaces and a portion of a lower surface of the flexible substrate are covered with a moisture-impermeable protective layer.

3. The scintillator panel according to claim 1, wherein a thickness of the thermal expansion compensation layer is greater than or equal to 1 μm and less than or equal to 100 μm.

4. The scintillator panel according to claim 1, wherein a phosphor layer is formed from an additive, as a starting material, containing cesium iodide and thallium using a vapor deposition technique.

5. The scintillator panel according to claim 1, wherein the flexible substrate contains at least one of a resin selected from the group of: polyethylene terephthalate, polyethylene naphthalate, cellulose acetate, polyamide, polyimide polyether-imide, epoxy, polyamide-imide, bismaleimide, fluororesins, acrylic resins, polyurethane, aramide, nylon, polycarbonate, polyphenylene sulfide, polyether sulfone, polysulfone, polyether ether ketone, and liquid crystal polymer, or a carbon fiber reinforced resin; or the flexible substrate is a thin film glass having a surface coated with a resin layer.

6. The scintillator panel according to claim 1, wherein the thermal expansion compensation layer contains at least one polymer selected from the group of: polyurethane, vinyl chloride copolymers, vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyral, polyester, cellulose derivatives (nitrocellulose), styrene-butadiene copolymers, various synthetic rubber-based resins, phenolic resins, epoxy resins, urea resins, melamine resins, phenoxy resins, silicone resins, acrylic resins, and urea formamide resins.

7. A radiation detector comprising:
   the scintillator and according to claim 1 as a line sensor.

8. The radiation detector according to claim 7, wherein the scintillator panel and a plurality of sensors are used in combination.

* * * * *